Oct. 30, 1962 S. L. RIDGWAY 3,060,678
EXHAUST MANIFOLD AFTERBURNER SYSTEM
Filed May 31, 1960 3 Sheets-Sheet 2
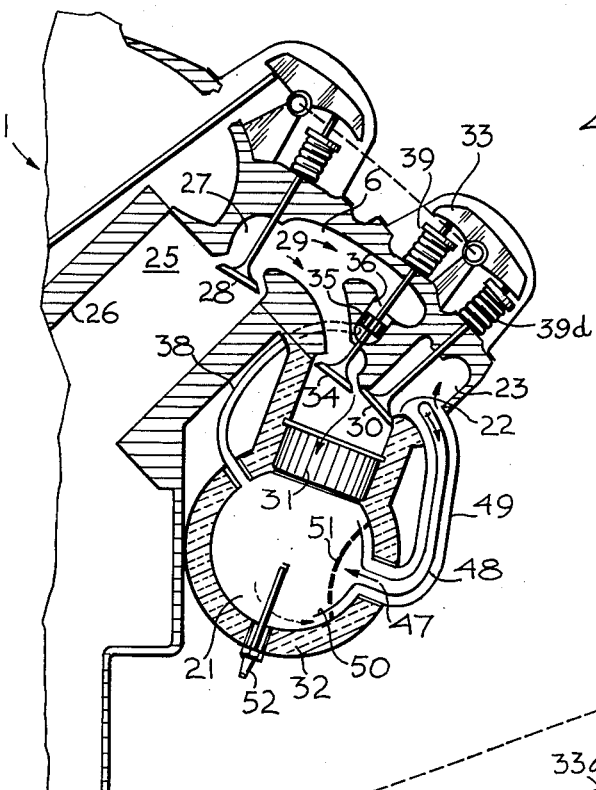
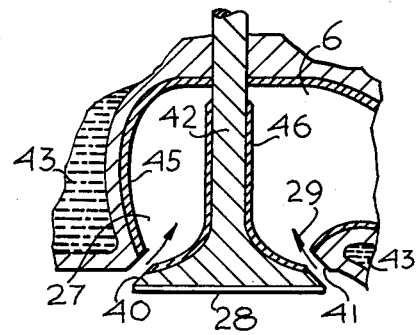
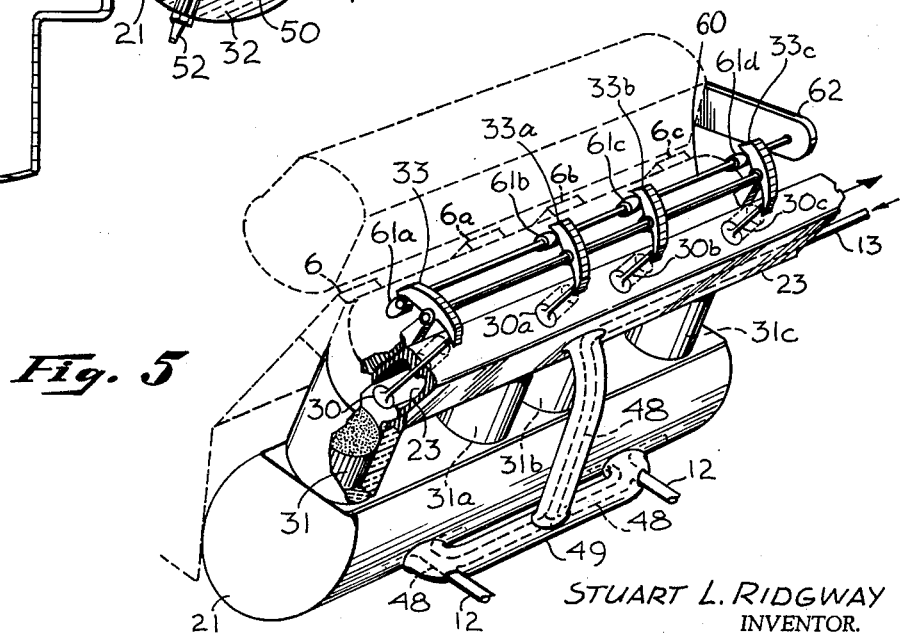
STUART L. RIDGWAY
INVENTOR.
BY
ATTORNEY

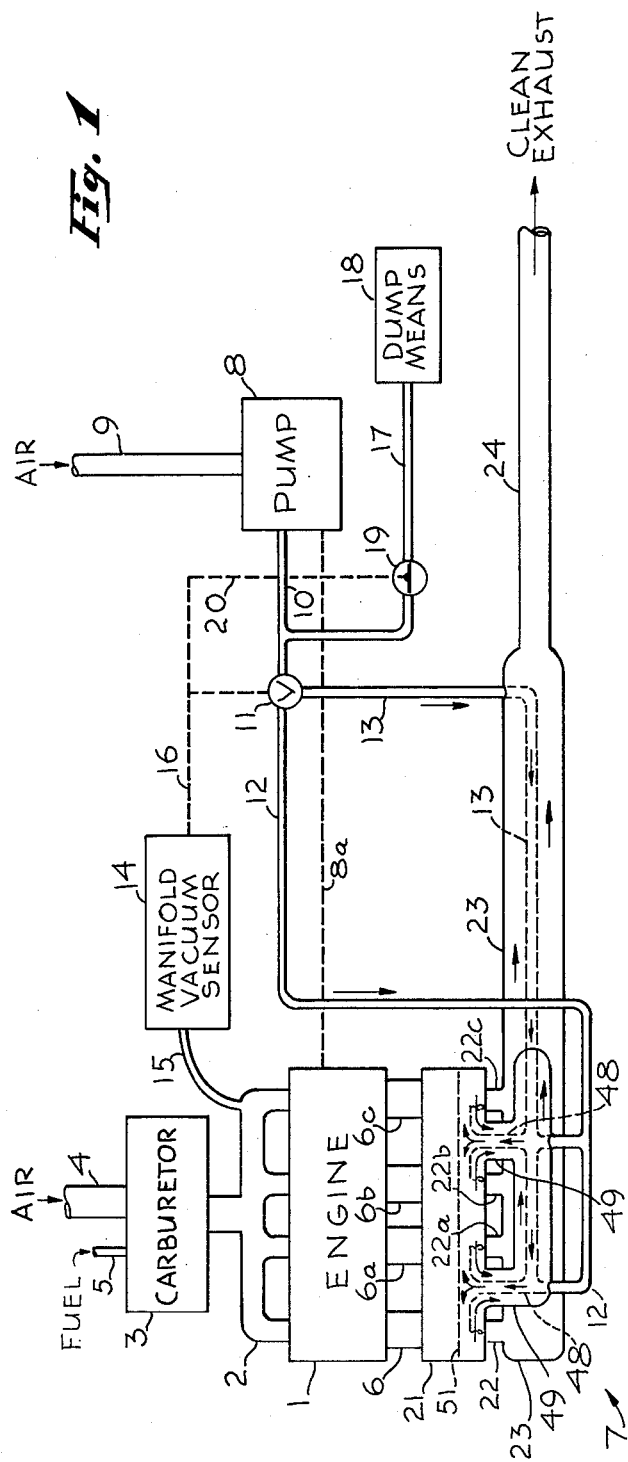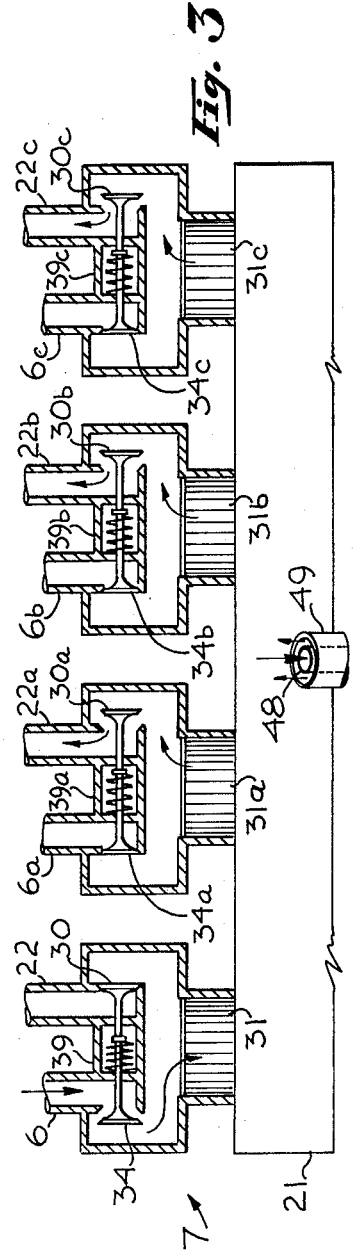

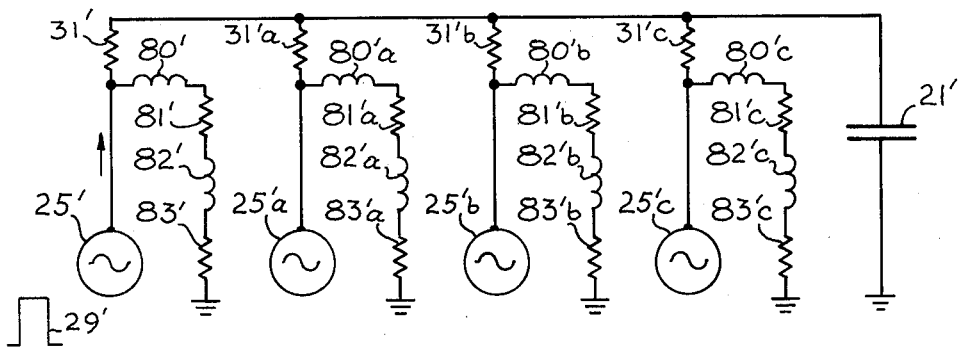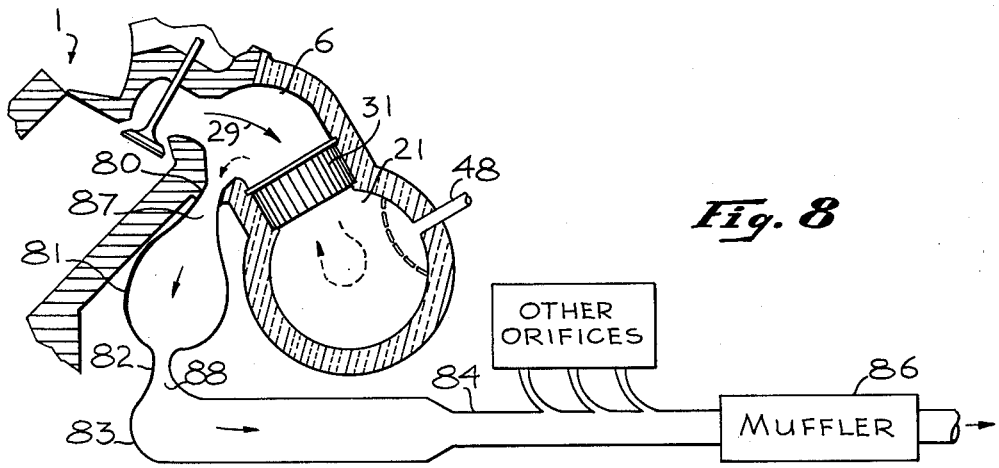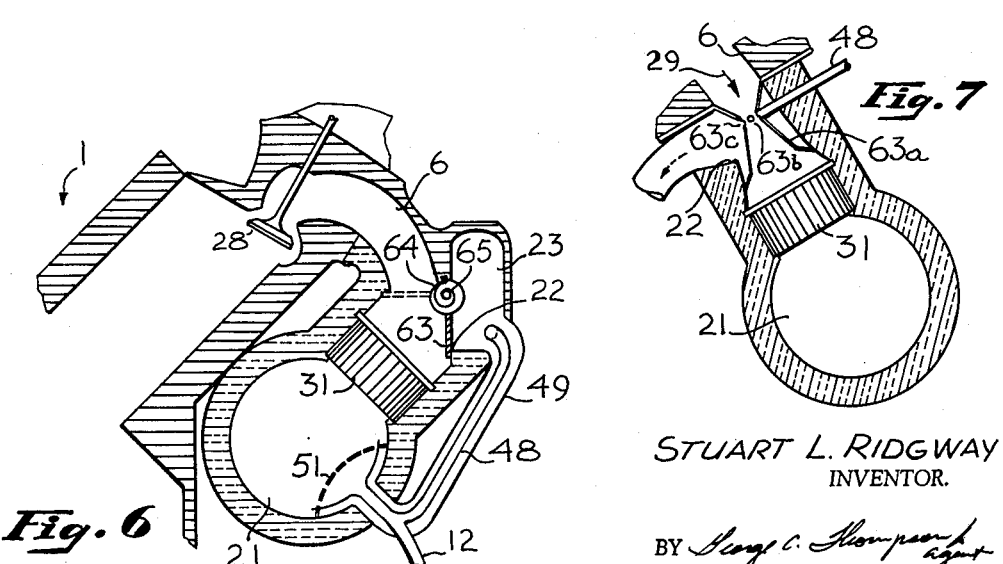

United States Patent Office 3,060,678
Patented Oct. 30, 1962

3,060,678
EXHAUST MANIFOLD AFTERBURNER SYSTEM
Stuart L. Ridgway, Redondo Beach, Calif., assignor to Thompson Ramo Wooldridge Inc., Canoga Park, Calif., a corporation of Ohio
Filed May 31, 1960, Ser. No. 32,738
24 Claims. (Cl. 60—30)

The present invention relates to a thermally regenerative afterburner system which is inherently compact whereby the placing of such a system within the housing of an internal combustion engine becomes feasible.

Accordingly this invention has for one of its objects the provision of a simple and reliable method and apparatus for completing the oxidation of combustible components of incompletely burned exhaust gas from a throttle controlled internal combustion engine wherein a desirable minimum temperature is maintained by efficient utilization of relatively small mass heat exchanging and heat storage matrices.

It is another object of this invention to provide an afterburner in close relation to the engine to reduce heat losses to a minimum.

It is still another object of this invention to provide an afterburner apparatus capable of utilizing the least amount of additional vehicle space over and above the standard vehicle equipment.

The foregoing and related objects are realized, in accordance with the present invention, by an afterburner apparatus including a plenum combustion chamber, and a plurality of heat exchangers, each of which receives heat from burned exhaust gas between each pulse or change of incompletely burned exhaust gas flow therethrough. The flow of the incompletely burned exhaust gas from each exhaust port of an internal combustion engine is directed so that the charge will pass through one of the heat exchanging and heat storage matrices to the plenum combustion chamber where combustion is completed and then pass through the other of the heat exchanging and heat storage matrices to an exhaust system.

One embodiment of the present invention includes an exhaust manifold valve operable to essentially prevent admission of incompletely burned exhaust gas directly from an engine combustion chamber exhaust port to the exhaust manifold. Thus each charge of incompletely burned exhaust gas is caused to pass through a heat exchanging and heat storage matrix to the plenum combustion chamber where complete oxidation of any residual smog producing combustibles is accomplished and wherein fresh air containing additional free oxygen is provided to support the combustion of such residual combustibles. The burned exhaust gas then passes from the plenum chamber through heat exchanging and heat storage matrices receptive of charges of incompletely burned exhaust gas from adjacent engine combustion chambers through open exhaust manifold valves to the atmosphere. A next pulse of incompletely burned exhaust gas passes from one of the adjacent engine combustion chamber exhaust ports through the adjacent heat exchanging and heat storage matrix to the plenum chamber and from the plenum chamber to the opened first-mentioned manifold exhaust valve and the remaining manifold exhaust valves, this process continuing until each of the combustion chambers has exhausted a charge of incompletely burned exhaust gas whereupon the cycle is repeated. Thus the flow path of a single charge of incompletely burned exhaust gas is from an exhaust port, past a closed manifold exhaust valve through a heated matrix, to the combustion chamber where combustion is completed, through other matrices where heat of combustion is deposited and then out adjacent open manifold exhaust valves.

The subject matter which is regarded as this invention is particularly pointed out and distinctly claimed in the concluding portion of the specification. The invention, however, as to its organization and method of operation, together with further objects and advantages thereof, will best be understood by reference to the following description taken in connection with the accompanying drawings, in which:

FIGURE 1 is a simplified layout of an afterburner system including the present invention;

FIGURE 2 is a cross-sectional view, partially broken away, of one embodiment of the present invention connected to an internal combustion engine;

FIGURE 3 is a schematic view showing the principles of operation of the invention shown in FIGURE 2;

FIGURE 4 is an enlarged detail view of a portion of the embodiment shown in FIGURE 2;

FIGURE 5 is a perspective view of another embodiment of the present invention connected to be receptive of exhaust gas from a bank of four cylinders of an engine;

FIGURE 6 is a cross-sectional view of another embodiment of the present invention;

FIGURE 7 is a cross-sectional view of a different embodiment of the present invention;

FIGURE 8 is a cross-sectional view of a further embodiment of the present invention; and FIGURE 9 is a schematic diagram of an electrical system substantially equivalent to the system shown in FIGURE 8.

Referring now to the drawings wherein similar numbers refer to like parts, there is shown an internal combustion engine 1 provided with an intake manifold 2 and a suitable fuel and air metering device such as a carburetor 3 connected to the intake manifold 2. The carburetor 3 can be of any suitable type capable of receiving air through a conduit 4 and fuel through a conduit 5 for the purpose of mixing the air and fuel in specified mixture ratios for delivery to the intake manifold 2 and engine 1.

The engine 1 is provided with a plurality of cylinders, not individually shown, each of which is provided with an exhaust passage 6, 6a, 6b and 6c, as in the case of a four cylinder engine. The exhaust passages 6 through 6c extend into an afterburner system 7 capable of receiving the exhaust gas through the passages 6 through 6c and mixing the exhaust gas with a supply of fresh air for completing burning of any unburned portion of the gas.

The afterburner 7 is provided with a pump means 8 capable of receiving air through an input conduit 9 and supplying air under pressure out through the output conduit 10 to a suitable valve 11. The pump 8 is driven by a suitable drive mechanism 8a connected to the engine 1. The valve 11 is controlled as explained hereinafter to supply air through either a conduit 12 or a conduit 13 depending upon engine operating conditions. Air passage selectively through the conduit 12 or 13 is necessary for providing either cooled fresh air or warmed fresh air, respectively, depending upon engine operation. In order to provide for the proper air delivery conduit selection by the valve 11, it is, therefore, necessary to have a device capable of sensing the engine operation for controlling purposes. For this purpose, a manifold vacuum sensor 14 is provided. The sensor 14 may take any suitable form such as an aneroid barometer device capable of expansion and contraction in response to variations in intake manifold pressure. The sensor 14 is, therefore, connected to the intake manifold through a suitable conduit 15. The sensor 14 is connected to control the valve 11 through a connection 16 and in response to manifold vacuum provides a selection of the air supply path. In addition, it has been found that different engine operations require different amounts of air to be supplied to the afterburner during the different operating conditions. For this purpose, a suitable dump conduit 17 is provided which is connected to the conduit 10 between the valve 11 and the supply pump 8 and which is controlled to dump selected amounts of air to the atmosphere through a suitable dump resistance 18 by an air dump valve 19. The air dump valve 19 is also connected through a control link 20 to the connection 16 of the manifold vacuum sensor 14.

For an explanation of a typical dump control operation in greater detail, reference is made to application Serial No. 787,524, now abandoned, entitled "Control Method and Apparatus," filed January 19, 1959, and continuation-in-part application thereof, Serial Number 806,645 entitled "Afterburner Control Method and Apparatus," filed April 15, 1959, each having inventors Allan B. Schaffer and Stuart L. Ridgway and assigned to the common assignee.

After the excess combustibles in the exhaust of the engine 1 have been consumed within a plenum chamber 21 of the afterburner 7, the completely burned exhaust gas is exhausted out through the conduits 22, 22a, 22b, and 22c to a suitable exhaust manifold 23. The exhaust manifold may be extended as shown in FIGURE 1 or may be terminated in an exhaust pipe (not shown) which is concentric with the air supply conduit 13 for preheating of the air entering the afterburner. Whether the exhaust manifold is extended or the exhaust pipe is adapted to include pipe 13, the manifold or pipe is terminated in a suitable exhaust output pipe 24 for connection to a muffler (not shown).

Referring now to FIGURE 2, the internal combustion engine 1 has a combustion chamber 25 in a cylinder 26 provided with an exhaust port 27 having thereover an exhaust port valve 28. During the exhaust stroke of the piston (not shown) within the cylinder 26 a charge of incompletely burned exhaust gas, travelling as indicated by the arrows 29, flows through the exhaust port 27 and a conduit 6 to the plenum chamber 21 for afterburning before entry into the manifold 23.

The exhaust gas manifold 23 is provided with an exhaust manifold valve 30, located in the exhaust manifold passage or opening 22. The valve 30 is moved to the illustrated closed position, as explained hereinafter, when the exhaust port valve 28 is open during cylinder 26 exhaust, so that the incompletely burned exhaust gas will pass through a heat exchanger or heat storage matrix 31 to the plenum chamber 21. Because of the heat conservation problem, the chamber 21 is substantially enclosed by a layer of high temperature insulation 32. The valve 30 closing action may be accomplished by the increased pressure within a portion of the conduit 6 or may be accomplished by a cam arrangement explained below in connection with FIGURE 5.

Since the pressure within the conduit 6 is substantially greater during the exhaust stroke than at any other time, the pressure may be utilized to insure the closing of the exhaust gas manifold valve 30. The particular arrangement illustrated in FIGURE 2 shows a rocker arm 33 which will cause the closing of the exhaust gas manifold valve 30 at the same time a pressure sensitive valve 34 is opened by the charge of incompletely burned exhaust gas moving as indicated by the arrows 29. In order to insure rapid response of the valve 30 to pressure within the conduit 6, valve operating means are also shown in FIGURE 2 for amplifying the effectiveness of the pressure of the incompletely burned exhaust gas emanating from the exhaust port 27. The particular valve operator illustrated is in the form of a pressure responsive cylindrical piston 35, within a mating cylindrical guide 36. Undesired back pressure under the piston 35 is prevented by the provision of a vent conduit 38 pneumatically connecting the lower surface of the piston 35 to the plenum chamber 21. Since the gauge pressure of each exhaust gas charge is on the order of ten or more times that within the plenum chamber 21, this will provide a considerable force to open the valve 34 and close the exhaust gas manifold valve 30. On the other hand, the pressure differential across the piston 35 is minimized during periods when a charge indicated by the arrows 29 is not being received in the conduit 6. Thus, at such times the pressure within the conduit 6, although greater than atmosphere, will not be greater than that within the plenum chamber 21 and the piston 35 will not tend to open the valve 34, or close the exhaust manifold valve 30. It is preferred that the piston 35 is fabricated of a bearing type material such as graphite so that it will be free at all times to provide a desired driving force for long periods of operation.

In order to maintain the valve 34 in a closed position during intake, compression and power strokes within the cylinder 26, and concurrently maintain the valve 30 open during exhaust strokes of adjacent combustion chambers, there is provided a biasing spring 39. During the other extreme position when the spring 39 is compressed, a smaller spring 39d positioned about the valve 30 stem causes the valve 30 to seat. The operating tolerance of the spring 39 between full open and full closed positions of the valve 34 may be made quite close because of the connection of pressure balancing vent tube 38 from the plenum chamber 21 to one side of the valve piston 35. In other words, the average pressure variation of the plenum chamber 21 will not materially affect the operation of the valves 34 and 30 in response to each charge indicated by the arrows 29 of incompletely burned exhaust gas.

It thus becomes apparent that the desired operation of the valves 30 and 34 is automatic. When the opening of the exhaust valve 28 of the cylinder 26 presents a charge of incompletely burned exhaust gas to the conduit 6, the pressure created therein is exerted both on the head of the valve 34 and on the piston 35 to open the valve 34, compress the spring 39, rotate the rocker arm 33 and allow the smaller spring 39d to close the valve 30. Such operation causes the incompletely burned exhaust gas emanating from the cylinder 26 at a temperature such as 600° F. to 1450° F. to pass through and be heated by the heat exchanging and heat storage matrix 31.

As mentioned above the problem of maintaining a proper temperature in afterburner combustion chamber 21 is one of the critical problems which must be solved. One arrangement which will increase the temperature of each exhaust gas charge indicated by the arrows 29 presented to the combustion chamber 21 is shown in FIGURE 4 in connection with the valve 28 wherein an enlarged cross-sectional view of the valve 28 is illustrated. As each charge, indicated by the arrows 29 of the incompletely burned exhaust gas passes between the valve surface 40 and the exhaust port 27 seat surface 41, it tends to heat these surfaces to the temperature of the charge. The heat transferred to the valve 28 normally passes through the metal to heat the entire valve member whereby the heat is dissipated from all portions thereof with much of the heat passing to the valve stem 42 and from there to the valve stem guide and support system and finally to the engine cooling system. Also the heat of the surface 41 normally passes through the surrounding metal directly to the cooling system including a water supply 43. However, if the conduction of heat from these surfaces 40 and 41 is restricted, the surfaces will more quickly reach the temperature of the charges indicated by the arrows 29 flowing therethrough and, therefore, will no longer accept heat from the charges. As a result, the charges will pass through the exhaust port 27 without extensive loss of heat and will be presented to the combustion chamber 21 at a higher temperature.

This restriction of heat flow is accomplished by placing insulation surfaces 45 and 46 along the elements 27 and 28, respectively, in the areas of the conduit and valve head and stem to prevent rapid heat transfer to these elements. Thus the charges indicated by the arrows 29 of incompletely burned exhaust gas are presented to plenum combustion chamber 21 at higher temperatures.

At the same time that charges of incompletely burned exhaust gas are presented to the plenum combustion chamber 21 the fresh air supply means (FIGURE 1) causes fresh air containing free oxygen, indicated by the arrow 47 to enter the plenum combustion chamber 21 through the fresh air supply conduit 48. At least during the flow of lean (relatively low combustible content) mixtures of incompletely burned exhaust gas, it is preferred that the fresh air be preheated prior to its admission into the plenum combustion chamber 21. One effective means of accomplishing fresh air preheating is to provide a simple heat exchanger. Such a heat exchanger is illustrated in FIGURES 1 and 2 in which a small bypass exhaust gas conduit 49 is shown connected between the plenum chamber 21 and the exhaust manifold 23 and is concentric with the fresh air supply pipe or conduit 48. The pipe 48 is connected between the fresh air supply pipe 13 and the plenum chamber 21 through the bypass pipe 49 leading from the exhaust manifold 23. The exhaust bypass conduit 49 bypasses only a small portion of the exhaust gas past the heat exchangers 31. The quantity of exhaust gas is only sufficient to provide a preheating operation. The end of the conduit 49 connected to the plenum chamber 21 is provided with a lead tube 50 for controlling the entry of exhaust gas into the conduit 49. It should be pointed out that the fresh air within the tube 48 flows in a direction opposite to the exhaust gas in the tube 49 thus providing for the highest fresh air temperature at the end of the tube 48 adjacent to plenum chamber 21.

In order that the smog producing hydrocarbons within the incompletely burned exhaust gas may be completely oxidized, it is preferred that the air supply means (FIGURE 1) provide fresh air at a rate which will result in a mixture within the combustion or plenum chamber 21 which is stoichiometric, or slightly leaner (a mixture is stoichiometric when all free oxygen combines with all combustibles). Moreover, it is preferred that the fresh air be distributed throughout the combustion chamber 21. One means for accomplishing the desired distribution is to provide a baffle or grid 51 extending lengthwise of the combustion chamber 21 to direct the fresh air along the chamber 21.

Also it is preferred, but not necessary, that auxiliary starting means, such as a spark plug 52, be provided to facilitate early ignition of the mixtures and the maintaining of a flame in the combustion chamber 21. However, according to the arrangement of the present invention, particularly during normal starting procedures of an internal engine, the incompletely burned exhaust gas charges indicated by the arrows 29 will soon cause sufficient heating of the combustion chamber 21 to ignite the incompletely burned exhaust gas. Thus, an afterburner is defined wherein the combustion within the chamber 21 will result in the oxidation of all smog producing combustibles by the utilization of the free oxygen supplied thereto.

In addition to the provision of a proper amount of preheated fresh air it is necessary to provide a desired preheating of the incompletely burned exhaust gas. According to the present invention, the properties of each heat exchanging a heat storage matrix 31 are important. In operation, each matrix, such as the matrix 31, receiving exhaust gas, receives heat from the burned exhaust gas flowing from the plenum combustion chamber 21 and imparts this heat to incompletely burned exhaust gas charges during subsequent flow in the reverse direction from the engine into the plenum 21.

The schematic representation shown in FIGURE 3 illustrates the principle of heat exchanger operation in a four cylinder engine or one bank of cylinders in an eight cylinder engine utilizing a valving arrangement similar to FIGURE 2 except that it is shown in a simplified form. In this illustration the number one or left cylinder is exhausting gas through the conduit 6 displacing the valve 34 to the left, as viewed in FIGURE 3, causing the valve 30 to be closed and directing the exhaust gas through the heat exchanging matrix 31. Movement of the valve 34 to the left compresses the return spring 39 and seats its companion valve 30. The gases, directed through the matrix 31, are received in the plenum chamber 21 where air is added by the air addition pipe 48 for afterburner combustion operation. The remaining three cylinders are, during this period, operating either in intake, compression or ignition functions not involving exhaust operation. This allows each of the bias springs 39a, 39b and 39c to cause the valves 34a, 34b, and 34c to be closed and each of the valves 30a, 30b and 30c to be opened. With the valves 30a, 30b and 30c opened, exhaust passages from the plenum chamber 21 to the exhaust manifold 23 (not shown in this view) are provided through the passages 22a, 22b and 22c. In order for the exhaust gases to leave the plenum chamber 21 and pass into the conduits 22a, 22b and 22c, it is necessary for them to pass through the matrices 31a, 31b and 31c. In passing through the matrices 31a, 31b and 31c, the matrices are heated and maintain the heat to be subsequently transferred to the engine-to-plenum incoming gases during following operations. The scope of the problem is better understood after considering briefly normal internal combustion engine operation.

It is recognized that engine operating conditions include several distinguishable operating regimes or conditions wherein the air-fuel mixture ratio varies considerably and wherein the rate of flow of air and fuel mixture varies, both as a function of engine speed and as a function of operating conditions. For instance, when a modern throttle-controlled internal combustion engine of 280 cubic inch displacement is operating at 3000 r.p.m. the throughput (air and fuel rate of flow) may be less than one lb./min. (pound per minute), four lb./min. or more than thirteen lb./min. depending on whether the engine 1 is operating in a deceleration regime with the engine absorbing energy from the momentum of the load such as an automobile, or in the cruise regime (constant speed and load), or in a full throttle regime (maximum power) respectively. Thus a charge flow rate may vary by more than 13 to 1. At 1000 r.p.m. the variation is on the order of only 5 to 1 and at 4000 r.p.m. the variation is on the order of 17 to 1. Similarly, the air-fuel intake mixture ratio varies as much as 2 to 1 between deceleration and cruise whereby the relative weight of combustibles present in each charge of incompletely burned exhaust gas may vary as much as 35 to 1 or more, as a function of the completeness of combustion within the engine 1.

Moreover, the temperature of the incompletely burned exhaust gas may vary during various operating conditions by as much as several hundred degrees Fahrenheit. For instance, during the deceleration regime, the engine 1 will tend to run cool and provide incompletely burned exhaust gas at temperatures as low as 700° F. or less and during the full throttle regime the engine 1 will tend to run hot and provide incompletely burned exhaust gas at temperatures as high as 1400° F. or more. These temperatures are by way of example only. For instance, if operation of the engine 1 is changed from the full throttle regime at 3050 r.p.m. to deceleration regime at 3000 r.p.m., the incompletely burned exhaust gas may be initially 200° F. or more hotter than normal temperature during the deceleration regime. Moreover, there are intermediate ranges of operation such as hill climbing or acceleration, and coasting.

One of the most difficult operating conditions for an afterburner system occurs during the slow speed cruise regime when the incompletely burned exhaust gas contains a low percentage of combustibles with a concurrent problem of minimum heat of combustion in the afterburner system. In the particular engine system being discussed, when adjusted for economical cruise operation, at speeds of 60 m.p.h. (3000 r.p.m.) the exhaust gas contains combustible materials which are the thermal equivalent of about 2 percent or more by weight of original fuel supplied and are discharged from the engine 1 towards the plenum combustion chamber 21 at temperatures of about 1300° F. Such a mixture is sufficiently inflammable to support a desired rate of combustion in the chamber 21 at a temperature above about 1350° F. Thus under these conditions a flame supporting temperature is 1400° F. or more. In addition, approximately 7 percent (compared to the air flow through the carburetor 3) additional fresh air is desired to insure the completion of combustion within the plenum chamber 21 of the combustible materials in the incompletely burned exhaust gas.

If the additional fresh air indicated by the arrow 47 is presented to the combustion chamber 21 at a temperature such as 100° F. it would be necessary to present the incompletely burned exhaust gas to the chamber 21 at a temperature of approximately 1525° F. Such operation becomes infeasible when the heat of combustion of the incompletely burned exhaust gas within the combustion chamber 21 is equivalent to 200° F. or less temperature rise in combustion for the particular mixture. For this reason the fresh air should be admitted to the combustion chamber at a temperature of 1350° F. or more, by diverting a small portion, such as 10 percent of the burned exhaust gas through the exhaust gas tube 49 in a heat exchanging relation with the fresh air in the fresh air supply conduit 48.

In an eight-cylinder, four cycle engine system, during 3000 r.p.m. operation, having a throughput of 4 lb./min. each exhaust gas charge weighs about .00033 pound (8 cylinders times 3000 r.p.m. times one-half exhaust stroke per revolution times .00033 pound exhaust stroke=4 p.p.m.). In accordance with the present invention, operating with such an eight cylinder engine, materials such as Pyroceram, alumina or porcelain have a heat storage capacity per unit weight approximately equal to that of air. Therefore, depending upon the effectiveness needed in the heat exchange, the order of at least .0004 pound of heat storage material will be necessary for each matrix 31. However, for general convenience, and generous promotion of heat storage capacity, it is preferred that at least about .01 pound of heat storage material be used for each matrix 31. In order that the matrix 31 may have a proper heat transfer characteristic, it should have a holey or honeycomb type construction, with a plurality, such as 200 to 1000 per square inch, of pores or channels defined by walls or surfaces of the type that may be heated quickly by the burned exhaust gas and quickly may impart their heat to incompletely burned engine exhaust gas charges. Also the material of the matrices should be thermally stable and capable of withstanding temperatures such as 2500° F. or 3000° F.

Referring now to FIGURE 5 wherein a complete plenum chamber 21 is shown in perspective. The incompletely burned exhaust gas selectively flows from one of the conduits 6 through 6c and passes through one of the matrices 31 through 31c into the plenum combustion chamber 21 where combustion is completed. The burned exhaust gas then flows from the chamber 21 through each of the remaining heat exchanger matrices 31 through 31c in a heat depositing relationship, through the exhaust manifold valves 30 through 30c to the exhaust manifold 23. The embodiment illustrated in FIGURE 5 includes a plurality of rocker arms 33 through 33c which are driven by a camshaft 60 having a plurality of cam surfaces 61a through 61d. The camshaft 60 is driven by gearing or a chain drive mechanism 62 (not shown in detail) which is synchronized with the driving means of the exhaust valves 28 (FIGURE 2). This synchronized drive results in the flow of each charge of incompletely burned exhaust gas through the plenum combustion chamber 21 prior to entry into the exhaust manifold 23.

Referring now to FIGURE 6, there is shown a typical conduit 6 communicating between the engine 1 and the plenum combustion chamber 21 with a matrix 31 connected therein adjacent to the plenum combustion chamber 21. The valving arrangement shown in FIGURE 6 is considerably simplified compared to that shown in FIGURE 2 with a flip-flop valve member 63 pivotally supported at 64 and biased by a suitable spring 65 so that each charge of incompletely burned exhaust gas emanating from the engine 1 will flip the valve 63 to the position shown in solid lines to close an exhaust conduit aperture 22 leading to the exhaust manifold 23. At the end of the exhaust movement the associated exhaust valve 28 closes causing cessation of cylinder exhaust of unburned exhaust gas into the plenum chamber 21. The pressure within the conduit 6 and the plenum 21 thus equalize to allow the valve 63 to flop back to the dotted line position by the bias spring 65. The spring 65 is designed to assure substantially complete closing of the opening to the manifold 23 upon the dynamic pressure change occurring as the valve 28 allows exhaust operation.

In order to provide a desired preheating of the fresh air supplied to the afterburner arrangement shown in FIGURE 6 the incoming fresh air passes through a conduit 13 which is mounted within the exhaust manifold 23 for a considerable length thereof and is connected to supply pipe 48 adjacent to the plenum combustion chamber 21 within a bypass pipe 49 for a short distance whereby the incoming fresh air is warmed to a temperature such as 1200° F. or more. Usually this temperature of the burned exhaust gas will be approximately equal to that of the incompletely burned exhaust gas because of the heat transfer characteristics of the matrices 31 through 31c. Such warming of the fresh air will reduce slightly the necessary temperature gradient across the matrices 31 whereby cruise regime incompletely burned exhaust gas as discussed above would only need to be raised from a temperature such as 1300° F. to 1375° F.

Since the obtaining of at least a desired minimum temperature is a problem primarily of the low exhaust combustibles cruise regime, while excessive temperatures may occur during the exhaust rich in combustibles in deceleration and full throttle regimes, the conduit 13 is preferably conductive of fresh air only during the cruise regime, and the fresh air will flow through an unheated conduit 12 during both the deceleration and the full throttle regimes. If the manifold vacuum is used to detect operation wherein preheating of fresh air is desirable, vacuums such as 8″ Hg to 17″ Hg will indicate the operation wherein such heating is necessary. The valve 11 in FIGURE 1 is controlled by the air control device 14 to direct all of the fresh air from the pipe 17 through the conduit 13 when the manifold vacuum is between 8″ Hg and 17″ Hg.

In the embodiment of FIGURE 7, the flip-flop valve of FIGURE 6 is replaced with a venturi device 63a provided with a throat 63b having openings 63c leading to the exhaust manifold 23 through the aperture 22. During exhaust periods, when the gas, indicated by the arrow 29, is being exhausted from the associated cylinder through its exhaust valve (each not shown) the gas passes through the venturi 63a and through the heat exchanger 31 to the plenum chamber 21. Due to the venturi action at the throat 63b a slight reduction of pressure takes place in the passage 22 and exhaust manifold (not shown) thus preventing the flow of exhaust gas directly from the cylinder into the manifold 23. Upon closing of the exhaust valve (not shown) gas is prevented from flowing through the conduit 6 and, therefore, has only one passage out and this is through the aperture 22 and exhaust manifold 23. It can be seen, therefore, that proper directional control without exhaust leakage and without a movable member is provided with this arrangement. If desired a portion of the venturi openings 63c can be connected to a fresh air supply conduit such as the conduit 48 of FIGURE 1 to supply the necessary fresh air with a smaller supply pump.

Referring now to FIGURE 8, there is shown another embodiment of the present invention wherein the afterburner plenum chamber 21 receives unburned exhaust gas from each cylinder of the engine 1 through the heat exchanging and heat storage matrix 31. However, the valving arrangement discussed above in connection with FIGURES 2, 3, 5 and 6 has been replaced by an acoustical network that presents such different impedances to the steady, and to the impulsive components of exhaust gas flow that the exhaust gas flows through the matrix 31 and into the afterburner plenum chamber 21 in essentially the same way to that shown in the prior arrangements. Thus each charge of gas passes from the engine 1, through a conduit such as the conduit 6 and a matrix such as the matrix 31 to the plenum chamber 21 and then returns through a plurality of heat exchanging or heat storage matrices 31a through 31c (similar to FIGURE 5) to the conduits 6 through 6c (see FIGURE 5). From the conduits 6 through 6c the burned exhaust gas escapes slowly through small orifices such as the orifice 80 to relatively larger containers such as the container 81 and from the larger container 81 through other small orifices such as the orifice 82 to exhaust chamber arrangements such as the chamber 83 and to an exhaust pipe 84 which conducts the burned exhaust gas to a relatively small muffler 86. In the illustration represented by FIGURE 8, the orifice 80 is connected to the chamber 81 by a smooth air flow nozzle 87, and the orifice 82 is connected to the exhaust chamber 83 by another smooth air flow nozzle 88 so that the kinetic energy of the gas flow may be transformed into pressure energy with a minimum of energy loss.

Perhaps this system may be most easily understood by comparison to an equivalent electrical system, as shown in FIGURE 9 which uses similar numbers to the previous descriptions except for the exponent prime ('). A pulse (charge) source generator 25' causes a short duration high magnitude pulse 29' to pass through a series of small resistors 31' to a large capacitor 21'. The pulse charge on the large capacitor 21' is then bled off through series circuits of large inductances 80' through 80'c and small resistances 81' through 81'c series connected with inductances 82' through 82'c and resistances 83' through 83'c. Also similar pulses are supplied to the capacitor 21' from the other sources 25'a, 25'b and 25'c (such as the other engine cylinders exhausting at different times). The reverse current flow through the small resistances 31' through 31'c and the inductances 80' through 80'c and the subsequent inductances and resistances is a relatively constant flow at any one time, with the rate of flow being a function of the average charge on the capacitor 21'. Since such charge or pulse from the source pulse 25' is of short duration compared to the period between pulses, practically all of each pulse will flow to the capacitor 21' prior to flowing at a constant rate through the high inductance paths.

By analogy most of the incompletely burned exhaust gas charges indicated by the arrow 29 will flow through the heat transfer and heat storage matrix 31 into the combustion chamber 21 prior to being exhausted through the orifice system 80–88. Thus a valveless arrangement will produce a desired flow pattern.

In each of the above embodiments of the present invention the combustion chamber 21 is designed with a volume adequate to burn exhaust gas of variable flow rates and variable inflammability. Since the particular engine 1 under consideration may be a V-8 engine, each plenum combustion chamber 21 is receptive of incompletely burned exhaust gas from only 4 cylinders (FIGURE 5). Thus, when the engine throughput at 3000 r.p.m. cruise is 4 p.p.m. each afterburner throughput is approximately 2.15 lb./min. (2 lb./min. incompletely burned exhaust gas and a .15 lb./min. fresh air) at the minimum flame supporting temperature of 1400° F. Such a mixture will react substantially completely in a combustion chamber of 300 cubic inches. However, with the rapid reversal of flow and turbulence because of admission of combustibles at first one point and then at another point, the provision of a plenum combustion chamber 21 of about 450 cubic inches is preferred.

Such a chamber will take the form of a 4 inch pipe closed at each end of a length of approximately 30 inches and this length is approximately equal to the length of one bank of cylinders of a V-8 engine. The insulation surrounding the combustion chamber is on the order of one inch thick whereby the overall diameter is about 6 inches. If the insulation is too thin the problem of maintaining flame supporting temperatures during the cruise regime becomes controlling. On the other hand, if the insulation is too effective, excessive temperatures are likely to occur during the deceleration regime.

If the minimum temperature is increased to 1700° F. the combustion chamber may be reduced to approximately 75 cubic inches for each manifold of a V-8 engine.

In at least some modern automobiles, it is contemplated that the conduits 6 through 6c, the exhaust manifold 23 and the valving devices may be arranged to be received within the space now occupied by existing exhaust manifolds of an engine system without requiring any additional space. The combustion chamber 21 may be located directly below the exhaust manifold 23 (FIGURE 2), below and inside the exhaust manifold 23 (FIGURE 6), above and outside the exhaust manifold 23 (FIGURE 8) or at other similar locations depending on the space available in each model engine compartment.

While there has been described what is at present considered a preferred embodiment of the invention, it will be obvious to those skilled in the art that various changes and modifications may be made therein without departing from the invention, and it is aimed in the appended claims to cover all such changes and modifications as fall within the true spirit and scope of the invention.

What is claimed is:

1. An afterburner system for an internal combustion engine having a plurality of cylinders capable of exhausting unburned exhaust gas, comprising: a plenum chamber; first conduit means for individually directing unburned exhaust gas from each cylinder into said plenum chamber; means for supplying fresh air to said plenum chamber for mixture therein with and to support combustion of said exhaust gas; a plurality of heat exchangers positioned in said first conduit means with one between each cylinder and said plenum chamber for exhaust gas passage to said chamber and burned gas discharge from said chamber therethrough; second conduit means for receiving burned gas exhausted from said plenum chamber; said second conduit means being connected to said first conduit means intermediate each cylinder and each heat exchanger; and flow control means for said second conduit means for substantially blocking the flow of unburned exhaust gas into said second conduit means during periods of cylinder exhaust operation.

2. An afterburner system for an internal combustion engine having a plurality of cylinders capable of exhausting unburned exhaust gas, comprising: a plenum chamber; first conduit means for individually directing unburned exhaust gas from each cylinder into said plenum chamber; means for supplying fresh air to said plenum chamber for mixture therein with and to support combustion of said exhaust gas; a plurality of heat exchangers positioned in said first conduit means with one between each cylinder and said plenum chamber for exhaust gas passage to said chamber and burned gas discharge from said chamber therethrough; second conduit means for receiving burned gas exhausted from said plenum chamber; said second conduit means being connected to said first conduit means intermediate each cylinder and each heat exchanger; flow control means for closing said second conduit means to passage of unburned exhaust gas during periods of cylinder exhaust operation; and said flow control means directing burned gas from said plenum chamber through said second conduit means during cylinder non-exhaust action periods.

3. An afterburner system for an internal combustion engine having a plurality of cylinders capable of exhausting unburned exhaust gas, comprising: a plenum chamber; fresh air supply means connected to said plenum chamber; first conduit means for individually directing unburned exhaust gas from each cylinder into said plenum chamber for mixture therein with fresh air supplied by said fresh air supply means; a plurality of heat exchangers positioned in said first conduit means with one between each cylinder and said plenum chamber for exhaust gas passage to said chamber and burned gas discharge from said chamber therethrough; second conduit means for receiving burned gas exhausted from said plenum chamber; said second conduit means being connected to said first conduit means intermediate each cylinder and each heat exchanger; flow control means for said second conduit means for blocking the passage of unburned exhaust gas into said second conduit means during periods of cylinder exhaust operation; and said first conduit means providing for unburned exhaust gas passage through only one of said heat exchangers at any one time.

4. An afterburner system for an internal combustion engine having a plurality of cylinders capable of exhausting unburned exhaust gas, comprising: a plenum chamber; first conduit means for individually directing unburned exhaust gas from each cylinder into said plenum chamber; means for supplying fresh air to said plenum chamber for mixture therein with and to support combustion of said exhaust gas; a plurality of heat exchangers positioned in said first conduit means with one for each cylinder for exhaust gas passage to said chamber and burned gas discharge from said chamber therethrough; second conduit means for receiving burned gas exhausted from said plenum chamber; said second conduit means being connected to said first conduit means intermediate each cylinder and each heat exchanger; flow control means for said second conduit means for substantially blocking the passage of unburned exhaust gas into said second conduit means during periods of cylinder exhaust operation; said first conduit means providing for unburned exhaust gas passage through only one of said heat exchanges at any one time; and said flow control means providing burned exhaust gas passage simultaneously through the remainder of said plurality of heat exchangers.

5. A control system for an afterburner means used on an internal combustion engine having a plurality of cylinders capable of discharging unburned gas into the afterburner means utilized for substantially complete consumption of unburned gas, the system comprising: a plurality of heat exchangers; first means for connecting the plurality of heat exchangers to respective cylinders; a plenum chamber; fresh air supply means connected to said plenum chamber; second means for connecting said plurality of heat exchangers to said plenum chamber; third means for connecting said plurality of heat exchangers for exhaust to the surrounding environment; and control means for said first and third means for at one time directing unburned exhaust gas from said cylinder to said plenum chamber through said heat exchanger and at a different time directing burned exhaust gas from said plenum chamber to the surrounding environment through said heat exchanger and said third means.

6. An afterburner system for an internal combustion engine having a plurality of cylinders capable of exhausting unburned exhaust gas, comprising: a plenum chamber; first conduit means for individually directing unburned exhaust gas from each cylinder into said plenum chamber; means for supplying fresh air to said plenum chamber for mixture therein with and to support combustion of said exhaust gas; a plurality of heat exchangers positioned in said first conduit means with one between each cylinder and said plenum chamber for exhaust gas passage to said chamber and burned gas discharge from said chamber therethrough; second conduit means for receiving burned gas exhausted from said plenum chamber; said second conduit means being connected to said first conduit means intermediate each cylinder and each heat exchanger; flow control means for said second conduit means for substantially blocking the passage of unburned exhaust gas into said second conduit means during periods of cylinder exhaust operation; and said flow control means being a two position valve means positioned to interrupt flow in said first conduit means in one position and to interrupt flow in said second conduit means in a second position.

7. An afterburner system for an internal combustion engine having a plurality of cylinders capable of exhausting unburned exhaust gas, comprising: a plenum chamber; first conduit means for individually directing unburned exhaust gas from each cylinder into said plenum chamber; means for supplying fresh air to said plenum chamber for mixture therein with and to support combustion of said exhaust gas; a plurality of heat exchangers positioned in said first conduit means with one between each cylinder and said plenum chamber for exhaust gas passage to said chamber and burned gas discharge from said chamber therethrough; second conduit means for receiving burned gas exhausted from said plenum chamber; said second conduit means being connected to said first conduit means intermediate each cyilnder and each heat exchanger; flow control means for closing said second conduit means to the passage of unburned exhaust gas during periods of cylinder exhaust operation; said flow control means being a two position valve means positioned to interrupt flow in said first conduit means in one position and to interrupt flow in said second conduit means in a second position; and bias means for said two position valve means for positioning said valve means in said one position under substantially equal plenum chamber and first conduit means pressure conditions.

8. An afterburner system for an internal combustion engine having a plurality of cylinders capable of discharging unburned gas into an afterburner means utilized for substantially complete consumption of unburned gas, the system comprising: a plurality of heat exchangers respectively connected to the plurality of engine cylinders for delivering unburned gas to each heat exchanger; each heat exchanger providing heat absorption action during its respective cylinder discharge action; a plenum chamber connected to each of said plurality of heat exchangers; fresh air supply means connected to said plenum chamber; first means for providing disposable exhaust operation from said plenum chamber through said heat exchangers for heat deposit action; and flow control means connected to interrupt the exhaust disposal operation of said first means for cylinders undergoing the discharge of unburned gas to the plenum chamber.

9. An afterburner system for an internal combustion engine having a plurality of cylinders capable of exhausting unburned exhaust gas, comprising: a plenum chamber; first conduit means for individually directing unburned exhaust gas from each cylinder into said plenum chamber; means for supplying fresh air to said plenum chamber for mixture therein with and to support combustion of said exhaust gas; a plurality of heat exchangers positioned in said first conduit means with one between each cylinder and said plenum chamber for exhaust gas passage to said chamber and burned gas discharge from said chamber therethrough; second conduit means for receiving burned gas exhausted from said plenum chamber; said second conduit means being connected to said first conduit means intermediate each cylinder and each heat exchanger; flow control means for said second conduit means for substantially blocking the passage of unburned exhaust gas into said second conduit means during periods of cylinder exhaust operation; said first conduit means providing separate passages between each cylinder and said plenum chamber; said flow control means being in the form of a pair of closure members for each passage of said first conduit means and its connected second conduit means; the members of each pair of closure members being interconnected and positioned to provide for the closure of one of said passages and the opening of the connection to said second conduit means in one extreme position and opening said one of said passages and the closing of the connection to said second conduit means in another extreme position.

10. An afterburner system for an internal combustion engine having a plurality of cylinders capable of exhausting unburned exhaust gas, comprising: a plenum chamber; first conduit means for individually directing unburned exhaust gas from each cylinder into said plenum chamber; means for supplying fresh air to said plenum chamber for mixture therein with and to support combustion of said exhaust gas; a plurality of heat exchangers positioned in said first conduit means with one between each cylinder and said plenum chamber for exhaust gas passage to said chamber and burned gas discharge from said chamber therethrough; second conduit means for receiving burned gas exhausted from said plenum chamber; said second conduit means being connected to said first conduit means intermediate each cylinder and each heat exchanger; flow control means for selectively closing said second conduit means to the passage of unburned exhaust gas into said second conduit means during periods of cylinder exhaust operation; said first conduit means providing separate passages between each cylinder and said plenum chamber; said flow control means being in the form of a pair of closure members for each pasasge of said first conduit means and its connected second conduit means; the closure members of each pair of closure members being interconnected and positioned to provide for closure of its associated passage and opening of the connection to said second conduit means in one extreme position and provide for opening of its associated passage and closure of the connection to said second conduit means in another extreme position; and bias means for each pair of closure members for normally positioning each pair of members in its said one extreme position.

11. An afterburner system for an internal combustion engine having a plurality of cylinders capable of exhausting unburned exhaust gas, comprising: a plenum chamber; first conduit means for individually directing unburned exhaust gas from each cylinder into said plenum chamber; means for supplying fresh air to said plenum chamber for mixture therein with and to support combustion of said exhaust gas; a plurality of heat exchangers positioned in said first conduit means with one between each cylinder and said plenum chamber for exhaust gas passage to said chamber and burned gas discharge from said chamber therethrough; second conduit means for receiving burned gas exhausted from said plenum chamber; said second conduit means being connected to said first conduit means intermediate each cylinder and each heat exchanger; flow control means for said second conduit means for substantially closing said second conduit means to the passage of unburned exhaust gas during periods of cylinder exhaust operation; said first conduit means providing separate passages between each cylinder and said plenum chamber; said flow control means being in the form of a pair of closure members for each passage of said first conduit means and its connected second conduit means; each closure member of said pair of closure members being interconnected and positioned to close one of said passages and open its connection to said second conduit means in one extreme position and open said one passage and close its connection to said second conduit means in another extreme position; bias means for each pair of closure members for normally positioning each pair of members in its one extreme position; and pressure responsive means connected to said first conduit means and each said pair of closure members for controlling each pair to respond to its associated engine cylinder exhaust of unburned gas to shift to said another extreme position.

12. An afterburner system for an internal combustion engine having a plurality of cylinders capable of exhausting unburned exhaust gas, comprising: a plenum chamber; first conduit means for individually directing unburned exhaust gas from each cylinder into said plenum chamber; means for supplying fresh air to said plenum chamber for mixture therein with and to support combustion of said exhaust gas; a plurality of heat exchangers positioned in said first conduit means with one between each cylinder and said plenum chamber for exhaust gas passage to said chamber and burned gas discharge from said chamber therethrough; second conduit means for receiving burned gas exhausted from said plenum chamber; said second conduit means being connected to said first conduit means intermediate each cylinder and each heat exchanger; flow control means for said second conduit means for blocking the passage of unburned exhaust gas into said second conduit means during periods of cylinder exhaust operation; and said flow control means including engine driven valve means for interrupting said second conduit means connection to said first conduit means during associated cylinder exhaust of unburned gas.

13. An afterburner system for an internal combustion engine having a plurality of cylinders capable of exhausting unburned exhaust gas, comprising: a plenum chamber; first conduit means for individually directing unburned exhaust gas from each cylinder into said plenum chamber; means for supplying fresh air to said plenum chamber for mixture therein with and to support combustion of said exhaust gas; a plurality of heat exchangers positioned in said first conduit means with one between each cylinder and said plenum chamber for exhaust gas passage to said chamber and burned gas discharge from said chamber therethrough; second conduit means for receiving burned gas exhausted from said plenum chamber; said second conduit means being connected to said first conduit means intermediate each cylinder and each heat exchanger; and flow control means including surge responsive means in the connection of said first conduit means to said second conduit means for preventing surges of unburned exhaust gas from entering said second conduit means; and said surge responsive means providing negligible resistance to a substantially constant burned exhaust gas pressure occurring in said plenum chamber.

14. An afterburner system for an internal combustion engine having a plurality of cylinders capable of exhausting unburned exhaust gas, comprising: a plenum chamber; first conduit means for individually directing unburned exhaust gas from each cylinder into said plenum chamber; means for supplying fresh air to said plenum chamber for mixture therein with and to support combustion of said exhaust gas; a plurality of heat exchangers positioned in said first conduit means with one between each cylinder and said plenum chamber for exhaust gas passage to said chamber and burned gas discharge from said chamber therethrough; second conduit means for receiving burned gas exhausted from said plenum chamber; said second conduit means being connected to said first conduit means intermediate each cylinder and each heat exchanger; flow control means for said second conduit means including surge responsive means for said connection of said first conduit means to said second conduit means for preventing surges of unburned exhaust gas from entering said second conduit means; said surge responsive means providing negligible resistance to a substantially constant burned exhaust gas pressure occurring in said plenum chamber; and said surge responsive means including a plurality of small orifices and low resistance surge chambers for each first conduit means to second conduit means connection.

15. An afterburner system for an internal combustion engine having a plurality of cylinders capable of exhausting unburned exhaust gas, comprising: a plenum chamber; first conduit means for individually directing unburned exhaust gas from each cylinder into said plenum chamber; means for supplying fresh air to said plenum chamber for mixture therein with and to support combustion of said exhaust gas; a plurality of heat exchangers positioned in said first conduit means with one between each cylinder and said plenum chamber for exhaust gas passage to said chamber and burned gas discharge from said chamber therethrough; second conduit means for receiving burned gas exhausted from said plenum chamber; said second conduit means being connected to said first conduit means intermediate each cylinder and each heat exchanger; flow control means for said second conduit means including surge responsive means for said connection of said first conduit means to said second conduit means for preventing surges of unburned exhaust gas from entering said second conduit means; said surge responsive means providing negligible resistance to a substantially constant burned exhaust gas pressure occurring in said plenum chamber; said surge responsive means including a plurality of high surge resistance small orifices separated by low resistance surge chambers series connected for each first conduit means to second conduit means connection.

16. For use with an internal combustion engine having a plurality of aligned exhaust ports sequentially exhausting charges of incompletely burned exhaust gas, an afterburner receptive of the incompletely burned exhaust gas; means for supplying fresh air containing oxygen to said afterburner for completing the combustion of the incompletely burned exhaust gas, an afterburner system comprising: a plenum combustion chamber in said afterburner wherein the incompletely burned exhaust gas is burned with at least some heat of combustion resulting; a plurality of heat exchanging and storage matrices having one relatively hot end open to said chamber; a plurality of conduits each connecting the other relatively cool end of each one of said matrices to a different one of the exhaust ports of the engine; exhaust apertures defined by a surface of each of said conduits arranged to receive burned exhaust gas from said chamber and exhaust it to the atmosphere; a first valve positioned to close a first of said apertures in a first of said conduits; first valve operating means connected to said first valve and operable to close said first aperture only when a charge of gas is flowing from a first of the aligned exhaust ports through a first of said matrices toward said chamber; at least a second valve positioned to close another of said apertures in another of said conduits; second valve operating means connected to said second valve and operable to close said another aperture only when a charge of incomplete burned exhaust gas is flowing from another of the aligned exhaust ports through another of said matrices to said chamber; and said first and second valve operating means being sequentially operable so that at least a portion of each charge flowing through said first matrix to said chamber will be exhausted from said chamber through said another matrix to impart heat thereto, and so that at least a portion of each charge flowing through said another matrix to said chamber will be exhausted from said chamber through said first matrix.

17. An afterburner for consuming the combustibles of the exhaust gas of an internal combustion engine having a plurality of aligned exhaust ports and providing fresh air containing oxygen for completing the combustion of the incompletely burned exhaust gas within the afterburner, comprising: a plenum combustion chamber; a plurality of heat exchanging and storage matrices each having one end open to said chamber; a plurality of conduits each connecting the other end of each one of said matrices to different ones of the exhaust ports of the engine; exhaust apertures each defined by a surface of each of said conduits and arranged to receive burned exhaust gas from said chamber and exhaust it to the atmosphere; and valve means operable to direct each charge of incompletely burned exhaust gas through one of said matrices to cause the matrix to deposit heat therein, and allow flow of burned exhaust gas from said chamber through other of said matrices to cause the matrices to extract heat therefrom for subsequent deposit to unburned exhaust gas.

18. An afterburner system for an internal combustion engine having a plurality of cylinders capable of exhausting unburned exhaust gas, comprising: a plenum chamber; first conduit means for individually directing unburned exhaust gas from each cylinder into said plenum chamber; means for supplying fresh air to said plenum chamber for mixture therein with and to support combustion of said exhaust gas; a plurality of heat exchangers positioned in said first conduit means with one between each cylinder and said plenum chamber for exhaust gas passage to said chamber and burned gas discharge from said chamber therethrough; second conduit means for receiving burned gas exhausted from said plenum chamber; said second conduit means being connected to said first conduit means intermediate each cylinder and each heat exchanger; and flow control means for substantially closing said second conduit means to the passage of unburned exhaust gas during periods of cylinder exhaust operation; said flow control means including venturi devices each having a throat with openings therein; each said venturi device openings being connected to said second conduit means for pressure reduction therein upon exhaust passage through said venturi devices from said first conduit means to said plenum chamber.

19. An afterburner system for an internal combustion engine having a plurality of cylinders capable of exhausting unburned exhaust gas, comprising: a plenum chamber; first conduit means for individually directing unburned exhaust gas from each cylinder into said plenum chamber; means for supplying fresh air to said plenum chamber for mixture therein with and to support combustion of said exhaust gas; a plurality of heat exchangers positioned in said first conduit means with one between each cylinder and said plenum chamber for exhaust gas passage to said chamber and burned gas discharge from said chamber therethrough; second conduit means for receiving burned gas exhausted from said plenum chamber; said second conduit means being connected to said first conduit means intermediate each cylinder and each heat exchanger; and flow control means for said second conduit means for substantially closing said second conduit means to the passage of unburned exhaust gas during periods of cylinder exhaust operation; said flow control means including venturi devices each having a throat with openings therein; a first portion of each of said venturi device openings being connected to said second conduit means for pressure reduction therein during exhaust gas passage through said venturi devices from said first conduit means to said plenum chamber; a third conduit means connected to a second portion of each of said venturi device throat openings and being open to atmosphere; each of said venturi devices providing fresh air addition during unburned exhaust gas passage therethrough.

20. In an afterburner system useful in cooperation with an internal combustion engine having at least one cylinder and periodically operable valve controlled exhaust gas discharge means from said cylinder, said system comprising: a combustion chamber having an inlet and an outlet; first passage means for conducting exhaust gas periodically discharged by said gas discharge means to said chamber; means for introducing air containing oxygen into said chamber to support combustion of inflammable constituents in said exhaust gas and to produce heat; second passage means for receiving burned exhaust gas discharged from said combustion chamber for conduction thereby to atmosphere; means for adding said heat of combustion produced in said chamber to exhaust gas entering said chamber; and means for blocking flow of said exhaust gas to said second passage means during each periodic discharge of said exhaust gas from said cylinder.

21. In an afterburner system useful in cooperation with an internal combustion engine having at least one cylinder and periodically operable valve controlled exhaust gas discharge means from said cylinder, said system comprising: a combustion chamber having an inlet and an outlet; first passage means for conducting exhaust gas periodically discharged by said gas discharge means to said chamber; means for introducing air containing oxygen into said chamber to support combustion of inflammable constituents in said exhaust gas and to produce heat; second passage means for receiving burned exhaust gas discharged from said combustion chamber for conduction thereby to atmosphere; heat storage and transfer means responsive to said heat of combustion produced in said chamber and active upon exhaust gas entering said chamber; and means for blocking flow of said exhaust gas to said second passage means during each periodic discharge of said exhaust gas from said cylinder.

22. In an afterburner system useful in cooperation with an internal combustion engine having at least one cylinder and periodically operable valve controlled exhaust gas discharge means from said cylinder, said system comprising: a combustion chamber having a common inlet and outlet; first passage means for conducting exhaust gas periodically discharged by said gas discharge means to said chamber; means for introducing air containing oxygen into said chamber to support combustion of inflammable constituents in said exhaust gas and to produce heat; second passage means for receiving burned exhaust gas discharged from said combustion chamber for conduction thereby to atmosphere; heat storage and transfer means positioned in said common inlet and outlet and responsive to said heat of combustion produced in said chamber and active upon exhaust gas entering said chamber; and means for blocking flow of said exhaust gas to said second passage means during each periodic discharge of said exhaust gas from said cylinder.

23. In an afterburner system useful in cooperation with an internal combustion engine having at least one cylinder and periodically operable valve controlled exhaust gas discharge means from said cylinder, said system comprising: a combustion chamber having a common inlet and outlet; first passage means positioned between said engine and said combustion chamber for conducting exhaust gas periodically discharged by said gas discharge means to said chamber; means for introducing air containing oxygen into said chamber to support combustion of inflammable constituents in said exhaust gas and to produce heat; second passage means coupled to said first passage means intermediate said engine and said chamber for receiving burned exhaust gas discharged from said combustion chamber for conduction thereby to atmosphere; heat storage and transfer means positioned in said common inlet and outlet and responsive to said heat of combustion produced in said chamber and active upon exhaust gas entering said chamber; and means for blocking flow of said exhaust gas to said second passage means during each periodic discharge of said exhaust gas from said cylinder.

24. An afterburner system according to claim 23 wherein means are provided to heat said air prior to introduction thereof into said combustion chamber.

References Cited in the file of this patent

UNITED STATES PATENTS

| | | |
|---|---|---|
| 1,789,812 | Frazer | Jan. 20, 1931 |
| 1,875,024 | Kryzanowsky | Aug. 30, 1932 |
| 2,851,852 | Cornelius | Sept. 16, 1958 |